United States Patent
Chen et al.

(10) Patent No.: US 9,913,315 B2
(45) Date of Patent: Mar. 6, 2018

(54) METHOD AND DEVICE FOR CONNECTION MANAGEMENT

(71) Applicant: Xiaomi Inc., Beijing (CN)

(72) Inventors: Yong Chen, Beijing (CN); Qiuzhi Huang, Beijing (CN); Yuquan Dong, Beijing (CN)

(73) Assignee: Xiaomi Inc., Beijing (CN)

( * ) Notice: Subject to any disclaimer, the term of this patent is extended or adjusted under 35 U.S.C. 154(b) by 115 days.

(21) Appl. No.: 14/806,889

(22) Filed: Jul. 23, 2015

(65) Prior Publication Data

US 2016/0113047 A1     Apr. 21, 2016

Related U.S. Application Data

(63) Continuation of application No. PCT/CN2015/074944, filed on Mar. 24, 2015.

(30) Foreign Application Priority Data

Oct. 20, 2014 (CN) .......................... 2014 1 0559632

(51) Int. Cl.
*H04L 29/06* (2006.01)
*H04W 76/02* (2009.01)
*H04W 12/06* (2009.01)

(52) U.S. Cl.
CPC ......... *H04W 76/027* (2013.01); *H04W 12/06* (2013.01)

(58) Field of Classification Search
USPC .......................................... 713/150; 370/329
See application file for complete search history.

(56) References Cited

U.S. PATENT DOCUMENTS

| 7,643,442 | B1 | 1/2010 | Calhoun |
| 8,375,454 | B2 | 2/2013 | Sun |
| 8,554,912 | B1 * | 10/2013 | Reeves ................. G06F 21/552 455/410 |
| 2002/0188868 | A1 | 12/2002 | Budka et al. |
| 2004/0028000 | A1 | 2/2004 | Billhartz |
| 2005/0249341 | A1 | 11/2005 | Mahone et al. |
| 2008/0207170 | A1 | 8/2008 | Khetawat et al. |
| 2008/0295144 | A1 * | 11/2008 | Cam-Winget .......... H04L 63/08 726/1 |

(Continued)

FOREIGN PATENT DOCUMENTS

| CN | 101207487 A | 6/2008 |
| CN | 101226575 A | 7/2008 |

(Continued)

OTHER PUBLICATIONS

Extended Search Report for European Application No. 15189579.4 from the European Patent Office, dated Mar. 21, 2016.

(Continued)

*Primary Examiner* — Jason Lee
(74) *Attorney, Agent, or Firm* — Finnegan, Henderson, Farabow, Garrett & Dunner LLP

(57) ABSTRACT

A method for a wireless router to perform connection management, includes: when a device tries to establish a wireless connection with the wireless router, counting a number of times of authentication failure of the device in a preset time period; and when the number of times of authentication failure is larger than or equal to a preset number threshold, performing a preset operation of risk treatment.

5 Claims, 12 Drawing Sheets

(56) References Cited

U.S. PATENT DOCUMENTS

| | | | |
|---|---|---|---|
| 2009/0031406 A1 | 1/2009 | Hirose | |
| 2011/0010550 A1 | 1/2011 | Sun | |
| 2011/0078311 A1 | 3/2011 | Nakashima | |
| 2014/0179238 A1 | 6/2014 | Wynn et al. | |
| 2015/0350182 A1* | 12/2015 | Pyle ........................ | H04L 29/14 726/7 |

FOREIGN PATENT DOCUMENTS

| | | | |
|---|---|---|---|
| CN | 101355556 A | 1/2009 | |
| CN | 101547187 A | 9/2009 | |
| CN | 103036733 A | 4/2013 | |
| CN | 103249040 A | 8/2013 | |
| CN | 103533600 A | 1/2014 | |
| CN | 104333863 A | 2/2015 | |
| JP | 2005184639 A | 7/2005 | |
| JP | 2005212436 A | 8/2005 | |
| JP | 2005536119 A | 11/2005 | |
| JP | 2006018812 A | 1/2006 | |
| JP | 2006074680 A | 3/2006 | |
| JP | 2006270414 A | 10/2006 | |
| JP | 2009031963 A | 2/2009 | |
| JP | 2009169861 A | 7/2009 | |
| JP | 2014191510 A | 10/2014 | |
| KR | 1020050064717 | 6/2005 | |
| KR | 1020110102282 | 9/2011 | |
| KR | 20140044528 A | 4/2014 | |
| KR | 1020140071801 | 6/2014 | |
| RU | 2390932 C2 | 5/2010 | |

OTHER PUBLICATIONS

English version of International Search Report of PCT Application No. PCT/CN2015/074944, dated Jun. 25, 2015, issued by the ISA/CN—State Intellectual Property Office of the P.R. China.

Office Action dated Sep. 8, 2016, in counterpart Russian Application No. 2015123452/08(036553) and English translation thereof.

International Search Report of PCT/CN2015/074944, from the State Intellectual Property Office of China, dated Jun. 25, 2015.

\* cited by examiner

METHOD AND DEVICE FOR CONNECTION MANAGEMENT

CROSS-REFERENCE TO RELATED APPLICATIONS

This application is a continuation of International Application No. PCT/CN2015/074944, filed Mar. 24, 2015, which is based on and claims priority to Chinese Patent Application No. 201410559632.1, filed on Oct. 20, 2014, the entire contents of all of which are incorporated herein by reference.

TECHNICAL FIELD

The present disclosure generally relates to the field of communication and, more particularly, to a method and a device for connection management.

BACKGROUND

With the development of network technologies, more and more electronic devices have functions of wireless connection. By joining a wireless network, such as a WiFi network, provided by a wireless router, a device may access the Internet, and may also access and control another device through the wireless network.

If unauthorized users can arbitrarily use a WiFi network provided by a wireless router, wireless resources may be occupied, such that wireless resources available for each authorized device may be decreased, which may influence usage experience of authorized users. Furthermore, since all devices access one wireless router, unauthorized users may illegally access other devices in the same WiFi network, which may lead to privacy leakage of authorized users and risk of account safety, etc.

Conventionally, to prevent unauthorized users from accessing the WiFi network, authentication of devices is required for the devices to join the WiFi network, by requiring users to input passwords.

SUMMARY

According to a first aspect of the present disclosure, there is provided a method for a wireless router to perform connection management, comprising: when a device tries to establish a wireless connection with the wireless router, counting a number of times of authentication failure of the device in a preset time period; and when the number of times of authentication failure is larger than or equal to a preset number threshold, performing a preset operation of risk treatment.

According to a second aspect of the present disclosure, there is provided a first device, comprising: a processor; and a memory for storing instructions executable by the processor, wherein the processor is configured to: when a second device tries to establish a wireless connection with the first device, count a number of times of authentication failure in a preset time period, and when the number of times of authentication failure is larger than or equal to a preset number threshold, perform a preset operation of risk treatment.

According to a third aspect of the present disclosure, there is provided a non-transitory storage medium having stored therein instructions that, when executed by one or more processors of a wireless router, cause the wireless router to perform a method for connection management, the method comprising: when a device tries to establish a wireless connection with the wireless router, counting a number of times of authentication failure of the device in a preset time period; and when the number of times of authentication failure is larger than or equal to a preset number threshold, performing a preset operation of risk treatment.

It is to be understood that both the foregoing general description and the following detailed description are only exemplary and explanatory, and are not intended for limiting the present disclosure.

BRIEF DESCRIPTION OF THE DRAWINGS

The accompanying drawings, which are incorporated in and constitute a part of the specification, illustrate embodiments consistent with the invention and, together with the description, are intended for explaining the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following exemplary embodiments do not represent all implementations in accordance with the invention. Instead, they are merely examples of devices and methods consistent with aspects of the invention as recited in the appended claims.

Figure 1:
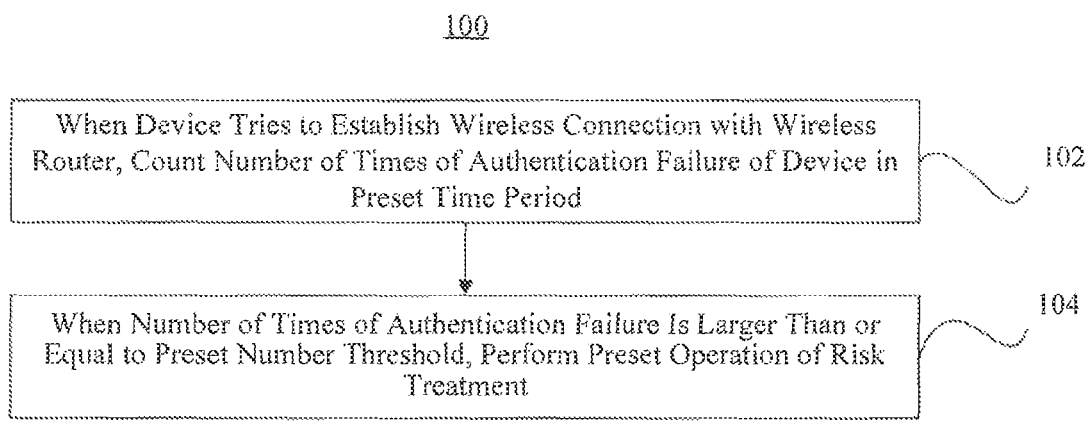
FIG. 1 is a flowchart of a method for connection management, according to an exemplary embodiment.

FIG. 1 is a flowchart of a method 100 for connection management, according to an exemplary embodiment. For example, the method 100 may be used in a wireless router. Referring to FIG. 1, the method 100 includes the following steps.

In step 102, when a device tries to establish a wireless connection with the wireless router, the wireless router counts a number of times of authentication failure of the device in a preset time period.

In the embodiment, when the device tries to access a wireless network, such as a WiFi network, provided by the wireless router, the wireless router needs to authenticate an identity of the device by, e.g., judging whether an authentication password input from the device by a user is correct. As a result, authentication failure may occur if a false authentication password is input from the device.

In the embodiment, when the device tries to access the wireless network a first time, authentication information, such as an authentication password, needs to be input from the device by the user. If an authentication is successful, the device may record the authentication password for accessing the wireless network next time. Therefore, if configuration of the wireless network does not change, authentication of the device that has ever connected to the wireless network generally will not fail, but authentication of the device that tries to access the wireless network the first time may fail due to a false authentication password.

In step 104, when the number of times of authentication failure is larger than or equal to a preset number threshold, the wireless router performs a preset operation of risk treatment.

In the embodiment, when an authentication password is input from the device by the user, the user may know the correct authentication password, which means the user is an authorized user. Although the authentication may fail incidentally due to a false input, the authorized user may correct the false input in time, which generally results in a limited number of times of authentication failure. On the contrary, if a user is an unauthorized user who does not know the correct authentication password, the unauthorized user has to try repeatedly to access the wireless network, which may lead to many times of authentication failure in a short time period. Hence, by monitoring the number of times of authentication failure in the preset time period, authorized and unauthorized users may be effectively discriminated, such that a risk of unauthorized access to the wireless network may be avoided.

In one exemplary embodiment, the operation of risk treatment includes recording the identity of the device of which the authentication fails for a number of times larger than or equal to the preset number threshold into a blacklist, so as to deny the device's access to the wireless network. In another exemplary embodiment, the operation of risk treatment includes informing the authorized user of identification information of the device of which the authentication fails, thereby the authorized user may determine whether to record the device into the blacklist, or take other measures.

By using the method 100, security of the wireless network may be improved.

Figure 2:
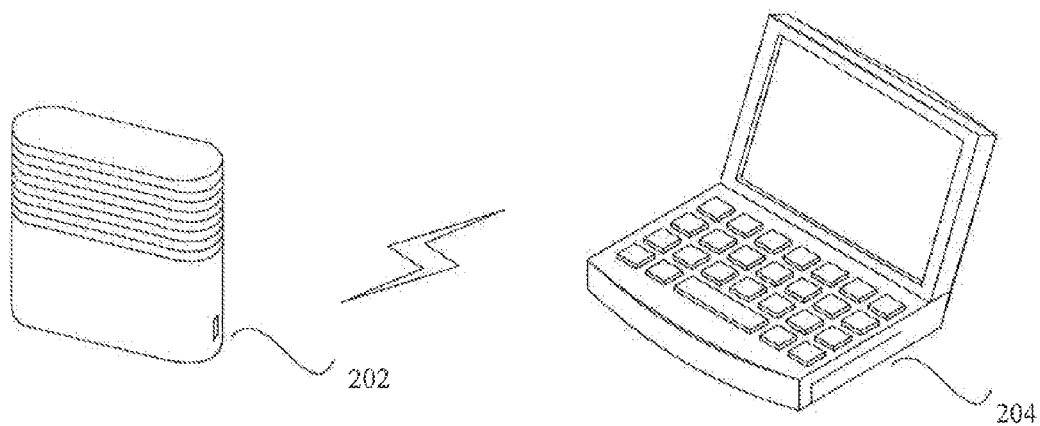
FIG. 2 is a block diagram of a system using a connection management method, according to an exemplary embodiment.
Figure 3:
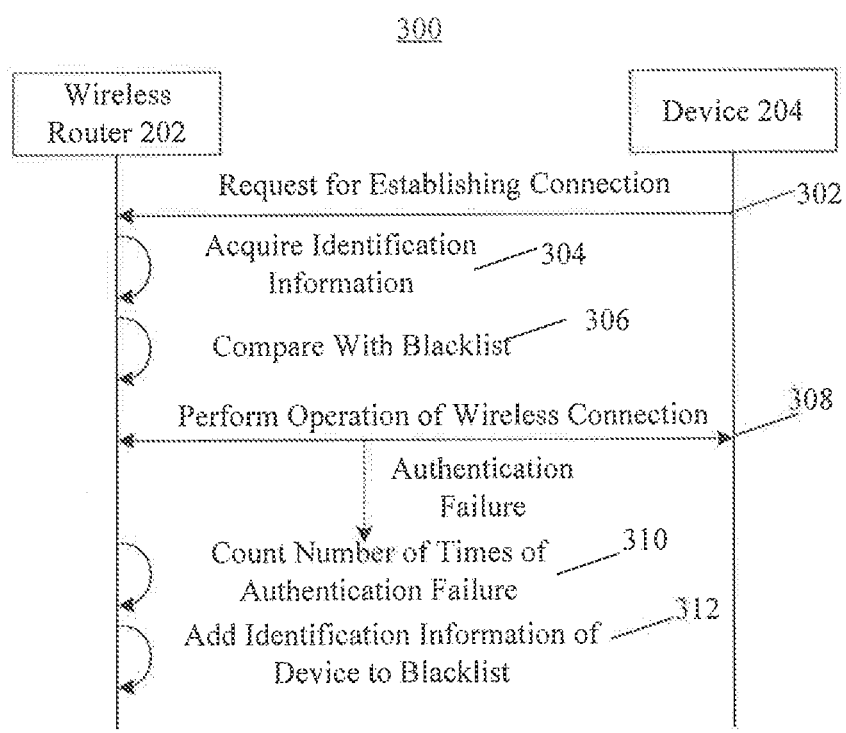
FIG. 3 is a flowchart of a connection management method, according to an exemplary embodiment.

FIG. 2 is a block diagram of a system 200 using a connection management method 300 (FIG. 3), according to an exemplary embodiment. Referring to FIG. 2, the system 200 includes a wireless router 202 and a device 204 that supports a wireless function. The device 204 initiates a connection request to the wireless router 202 for accessing a wireless network provided by the wireless router 202. FIG. 3 is a flowchart of the connection management method 300, according to an exemplary embodiment. Referring to FIGS. 2 and 3, the method 300 includes the following steps.

In step 302, the device 204 initiates a request for establishing a connection to the wireless router 202.

In the embodiment, the device 204 may be a laptop, or any other device that supports wireless communication, such as a smart phone, a tablet computer, etc.

In the embodiment, the request for establishing the connection may include one or more messages sent from the device 204 to the wireless router 202, which is not limited in the present disclosure.

In step 304, the wireless router 202 acquires identification information of the device 204.

In the embodiment, the identification information may be hardware information of the device 204, such as a media access control (MAC) address, etc., or any other information for identifying the device 204.

In the embodiment, the identification information may be acquired from the request for establishing the connection transmitted by the device 204. For example, when the identification information is the MAC address of the device 204, the MAC address is acquired from an origin address of a message corresponding to the request for establishing the connection.

In step 306, the wireless router 202 compares the identification information of the device 204 with a preset blacklist.

In step 308, if the identification information of the device 204 is not identified in the blacklist, an operation of a wireless connection is performed between the wireless router 202 and the device 204. Otherwise, the request for establishing the connection from the device 204 may be ignored, and the wireless router 202 refuses to establish a connection with the device 204.

In step 310, the wireless router 202 determines whether an authentication of the device 204 is successful by determining, for example, whether an authentication password received from the device 204 is correct. If the authentication of the device 204 fails, a number of times of authentication failure is increased by one, and step 310 is repeated.

In step 312, when the number of times of authentication failure in a preset time period is larger than or equal to a preset number threshold, the identification information of the device 204 is added into the blacklist, so as to deny the device 204's access to the wireless network provided by the wireless router 202.

In the embodiment, when the user of the device 204 is an unauthorized user of the wireless network who does not know the correct authentication password, the unauthorized user generally needs to try repeatedly to guess the authentication password. As a result, many times of authentication failure may happen in a short time period, which can be distinguished from occasional false inputs of an authorized user.

In the embodiment, the preset time period may be set to a default value by a manufacturer of the wireless router 202, or may be set by the authorized user to, e.g., 3 minutes.

By using the method 300, the wireless router 202 may automatically recognize unauthorized access to the wireless network by counting the number of times of authentication failure in the preset time period, and add the device 204 that conducts the unauthorized access to the wireless network into the blacklist, to prevent the device 204 from accessing the wireless network, thereby providing normal usage and high security of the wireless network.

Figure 4:
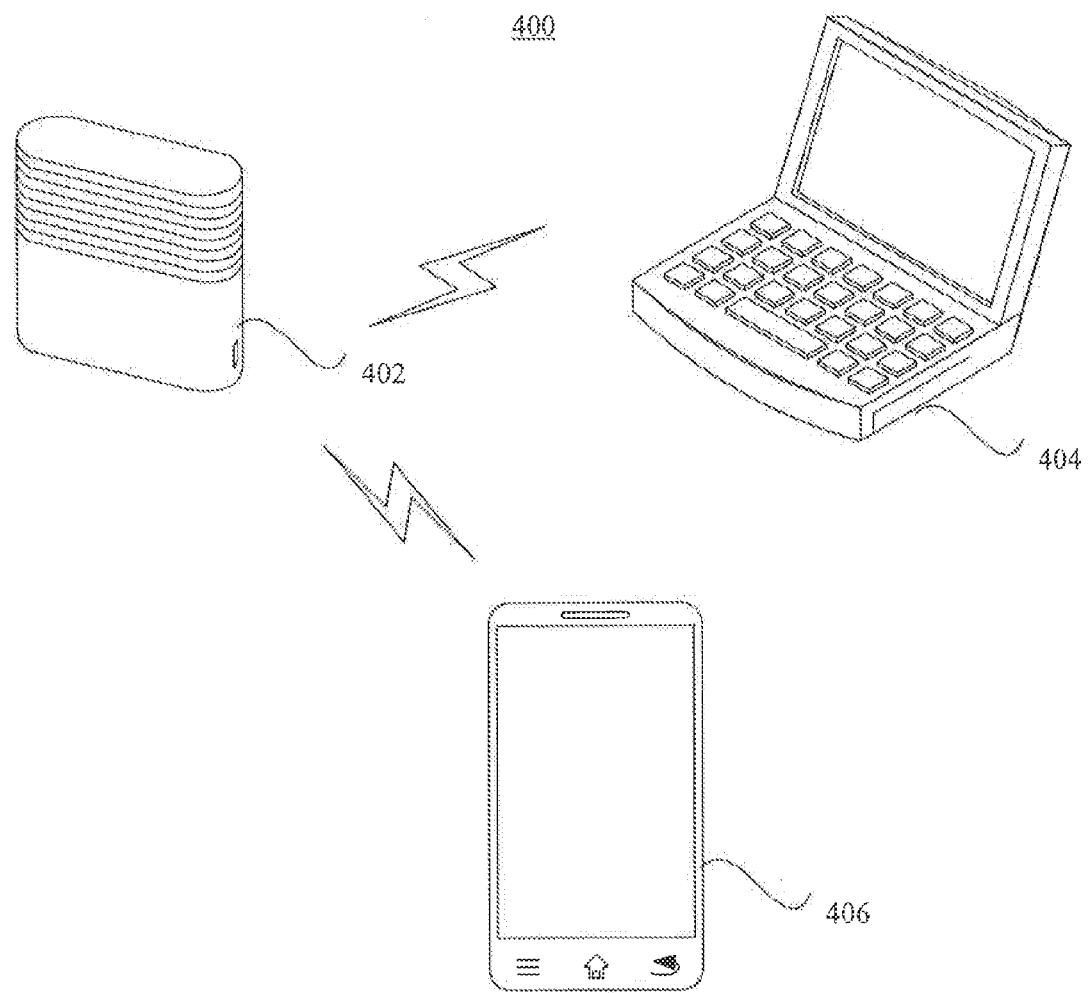
FIG. 4 is a block diagram of a system using a connection management method, according to an exemplary embodiment.
Figure 5:
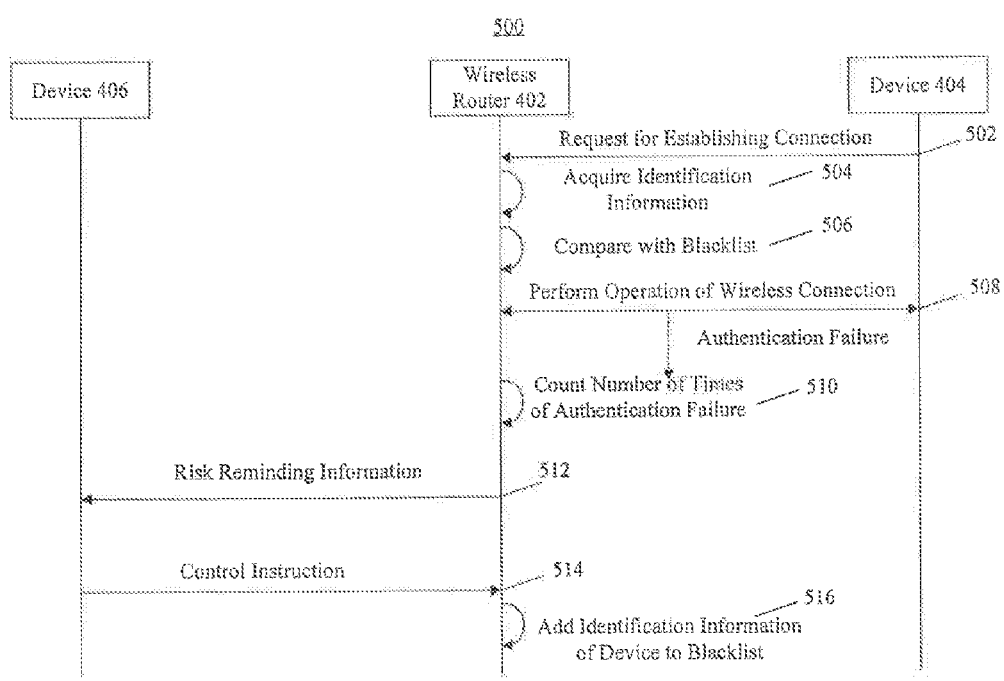
FIG. 5 is a flowchart of a connection management method, according to an exemplary embodiment.

FIG. 4 is a block diagram of a system 400 using a connection management method 500 (FIG. 5), according to an exemplary embodiment. The system 400 includes a wireless router 402 and first and second devices 404 and 406 that support a wireless function. The device 404 initiates a connection request to the wireless router 402 for accessing a wireless network provided by the wireless router 402. The device 406 is a preset management terminal. FIG. 5 is a flowchart of the connection management method 500, according to an exemplary embodiment. Referring to FIGS. 4 and 5, the method 500 includes the following steps.

In step 502, the device 404 initiates a request for establishing a connection to the wireless router 402.

In the embodiment, the device 404 may be a laptop, or any other device that supports wireless communication, such as a smart phone, a tablet computer, etc.

In the embodiment, the request for establishing the connection may include one or more messages sent from the device 404 to the wireless router 402, which is not limited in the present disclosure.

In step 504, the wireless router acquires identification information of the device 404.

In the embodiment, the identification information may be hardware information of the device 404, such as a MAC address, etc., or any other information for identifying the device 404.

In the embodiment, the identification information may be acquired from the request for establishing the connection transmitted by the device 404. For example, when the identification information is the MAC address of the device 404, the MAC address is acquired from an origin address of a message corresponding to the request for establishing the connection.

In step 506, the wireless router 402 compares the identification information of the device 404 with a preset blacklist.

In step 508, if the identification information of the device 404 is not identified in the blacklist, an operation of a wireless connection is performed between the wireless router 402 and the device 404. Otherwise, the request for establishing the connection from the device 404 is ignored, and the wireless router 402 refuses to establish a connection with the device 404.

In step 510, the wireless router 402 determines whether an authentication of the device 404 is successful by determining, for example, whether an authentication password received from the device 404 is correct. If the authentication of the device 404 fails, a number of times of authentication failure is increased by one, and step 510 is repeated.

In step 512, when the number of times of authentication failure in a preset time period is larger than or equal to a preset number threshold, the wireless router 402 transmits risk reminding information to the device 406.

Figure 6:
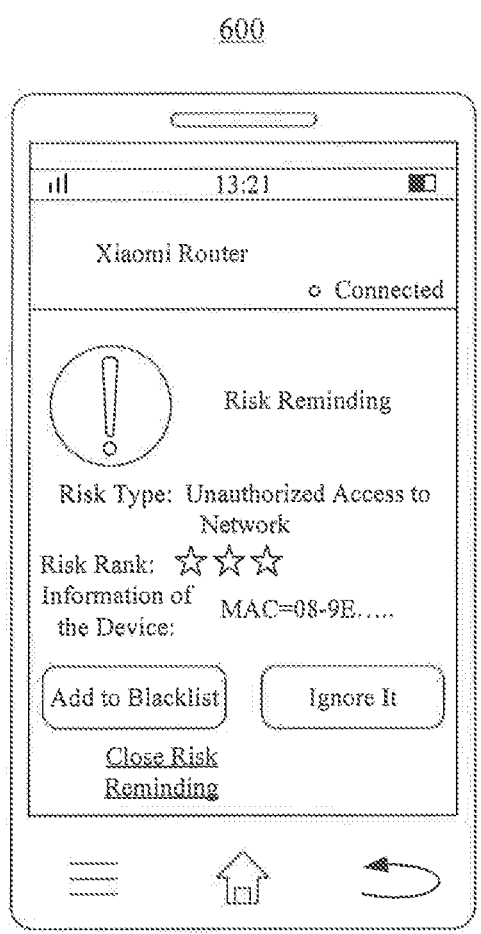
FIG. 6 is a schematic diagram of a user interface for connection management, according to an exemplary embodiment.

In the embodiment, the risk reminding information is displayed on a user interface of the device 406. FIG. 6 is a schematic diagram of a user interface 600 of the device 406, according to an exemplary embodiment. Referring to FIG. 6, the user interface 600 may display a risk type, a risk rank, device information, etc., which are provided for a user of the device 406 to analyze potential risks. When the user confirms that the device 404 is a device that is unauthorized to access the wireless network, and wants to prevent the device 404 from accessing the wireless network, the user can select an operation such as adding the device 404 to the blacklist, or ignoring the request for establishing the connection from the device 404.

Referring back to FIGS. 4 and 5, in the present embodiment, the device 406 is located in the wireless network provided by the wireless router 402, thereby to exchange information with the wireless router 402 using the wireless network. In another exemplary embodiment, the device 406 is located out of the wireless network provided by the wireless router 402, and may exchange information with the wireless router 402 using the Internet. Accordingly, the user of the device 406 may control the wireless network provided by the wireless router 402 remotely. For example, the user may use the device 406 to remotely manage the wireless network located at home when working in a company.

In step 514, the wireless router 402 receives a control instruction from the device 406.

In the embodiment, in a period after the wireless router 402 detects a risk of unauthorized access to the wireless network at step 510, and before the wireless router 402 receives the control instruction at step 514, the operation of the authentication with regard to the device 404 may be paused, so as to prevent the device 404 from decoding the authentication password of the wireless router 402 during this period. Alternatively, all authentication results with regard to the device 404 in the preset time period are set to authentication failure, so as to prevent the device 404 from accessing the wireless network.

In step 516, if the control instruction received from the device 406 instructs adding the device 404 into the blacklist, the wireless router 402 adds the identification information of the device 404 into the blacklist. Alternatively, if the control instruction from the device 406 instructs ignoring the request for establishing the connection from the device 404, the wireless router 402 may perform authentication of the device 404 in future use.

Additionally, in the embodiments illustrated in FIG. 3 and FIG. 5, if the user determines that a device is added into the blacklist by mistake, the user may log into an account for the wireless router and cancel a record of the device in the blacklist, so as to remove the device from the blacklist.

Figure 7:
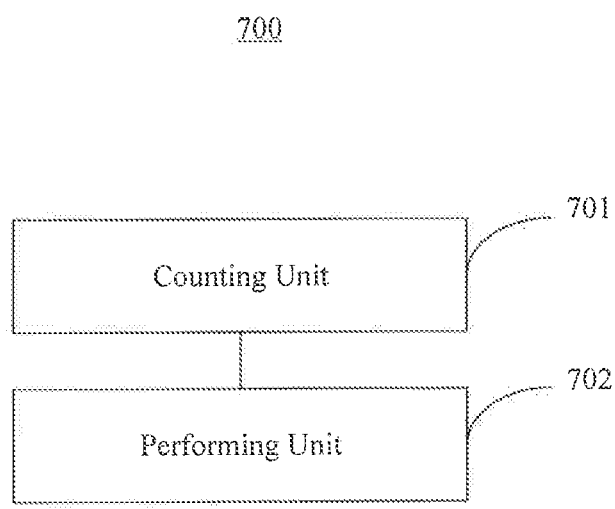
FIG. 7 is a block diagram of an apparatus for connection management, according to an exemplary embodiment.

FIG. 7 is a block diagram of an apparatus 700 for connection management, according to an exemplary embodiment. For example, the apparatus 700 may be a part of a wireless router or the whole wireless router. Referring to FIG. 7, the apparatus 700 includes a counting unit 701 and a performing unit 702.

The counting unit 701 is configured to count a number of times of authentication failure of a device in a preset time period when the device tries to establish a connection with the wireless router.

The performing unit 702 is configured to perform a preset operation of risk treatment when the number of times of authentication failure is larger than or equal to a preset number threshold.

Figure 8:
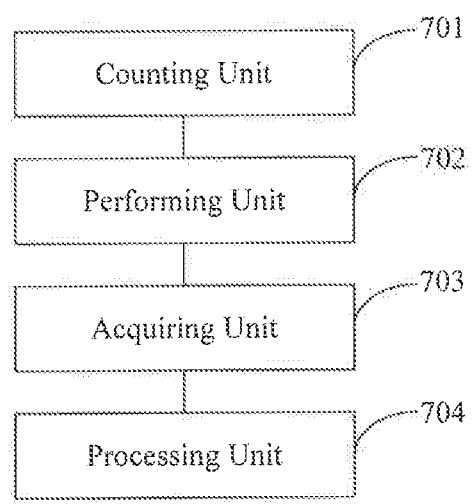
FIG. 8 is a block diagram of an apparatus for connection management, according to an exemplary embodiment.

FIG. 8 is a block diagram of an apparatus 800 for connection management, according to an exemplary embodiment. For example, the apparatus 800 may be a part of a wireless router or the whole wireless router. Referring to FIG. 8, the apparatus 800 includes an acquiring unit 703 and a processing unit 704, in addition to the counting unit 701 and the performing unit 702 (FIG. 7).

The acquiring unit 703 is configured to acquire identification information of the device when the apparatus 800 receives a request for establishing a connection with the wireless router transmitted by the device.

The processing unit 704 is configured to ignore the request for establishing the connection if the identification information of the device is identified in a preset blacklist. Otherwise, the processing unit 704 performs an operation of a wireless connection with the device.

Figure 9:
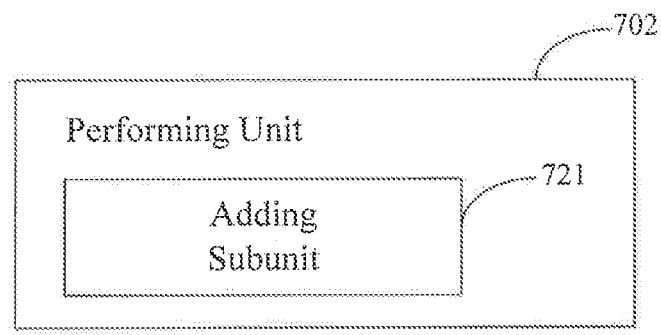
FIG. 9 is a block diagram of a performing unit, according to an exemplary embodiment.

FIG. 9 is a block diagram of the performing unit 702 (FIG. 8), according to an exemplary embodiment. Referring to FIG. 9, the performing unit 702 includes an adding subunit 721 configured to add the identification information of the device to the blacklist.

Figure 10:
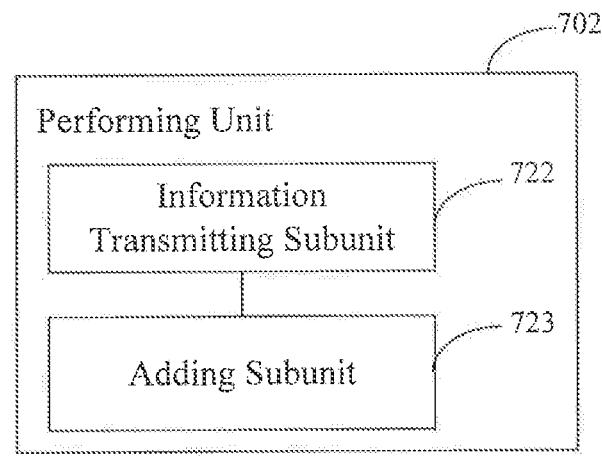
FIG. 10 is a block diagram of a performing unit, according to an exemplary embodiment.

FIG. 10 is a block diagram of the performing unit 702 (FIG. 8), according to an exemplary embodiment. Referring to FIG. 10, the performing unit 702 includes an information transmitting subunit 722 and an adding subunit 723.

The information transmitting subunit 722 is configured to transmit risk reminding information to a preset management terminal.

The adding subunit 723 is configured to add the identification information of the device to the blacklist, according to a control instruction from the management terminal.

Figure 11:
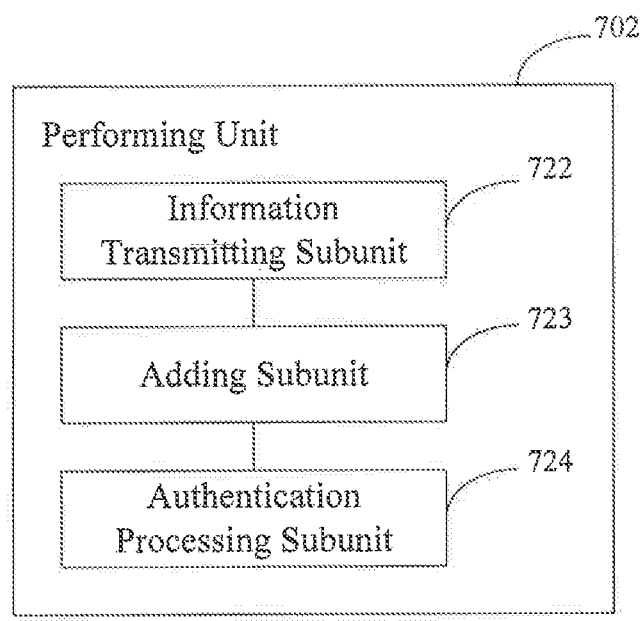
FIG. 11 is a block diagram of a performing unit, according to an exemplary embodiment.

FIG. 11 is a block diagram of the performing unit 702 (FIG. 10), according to an exemplary embodiment. Referring to FIG. 11, the performing unit 702 includes an authentication processing subunit 724, in addition to the information transmitting subunit 722 and the adding subunit 723 (FIG. 10).

The authentication processing subunit 724 is configured to, after the risk reminding information is transmitted and before the control instruction is received, pause an operation of authentication with regard to the device, or set all authentication results with regard to the device in the preset time period to authentication failure.

Figure 12:
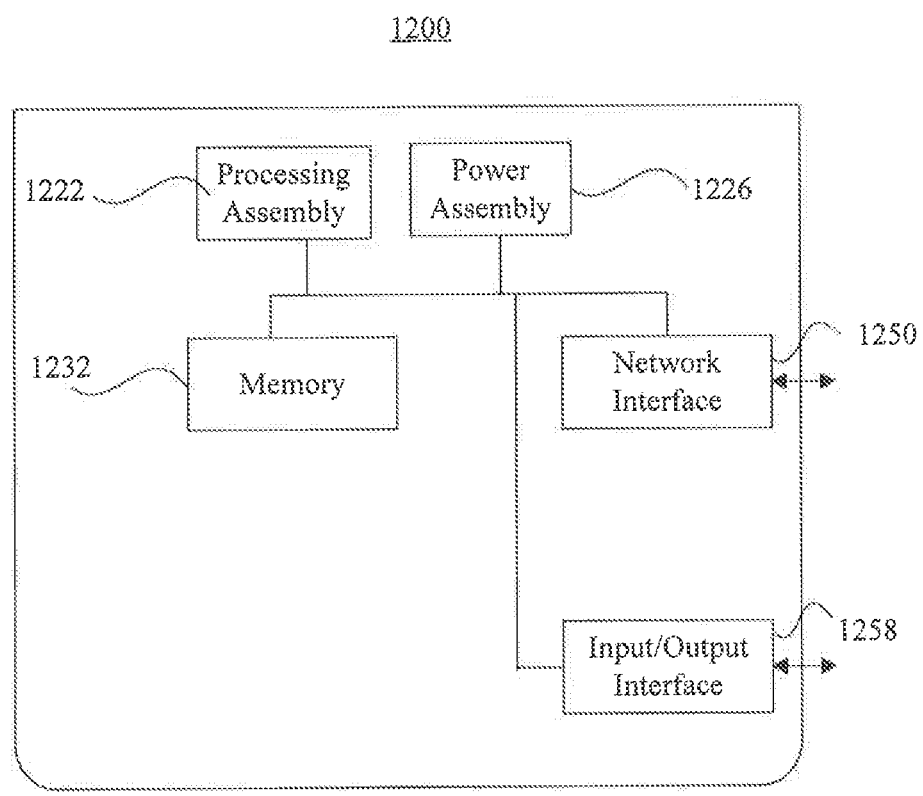
FIG. 12 is a block diagram of a device, according to an exemplary embodiment.

FIG. 12 is a block diagram of a device 1200 for connection management, according to an exemplary embodiment. For example, the device 1200 may be provided as a wireless router, or as a smart terminal with functions of a wireless router. Referring to FIG. 12, the device 1200 includes a processing assembly 1222 that further includes one or more processors, a memory 1232 configured to store instructions executable by the processing assembly 1222, such as an application program. The application program stored in the memory 1232 may include one or more modules, each of which corresponds to a group of instructions. Additionally, the processing assembly 1222 is configured to execute instructions for implementing the above described connection management methods.

The device 1200 may further include a power assembly 1226 configured to implement power management of the device 1200, a wired or wireless network interface 1250 configured to connect the device 1200 with a network, and an input/output (I/O) interface 1258. The device 1200 may run an operating system stored in the memory 1232, for example, Windows Server™, Mac OS X™, Unix™, Linux™, FreeBSD™ or the like.

One of ordinary skill in the art will understand that the above described units and subunits can each be implemented by hardware, or software, or a combination of hardware and software. One of ordinary skill in the art will also understand that multiple ones of the above described units and subunits may be combined as one unit, and each of the above described units may be further divided into a plurality of subunits.

Other embodiments of the present disclosure may be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It may be understood that, the present disclosure is not limited to the exact constructions that has been described above and illustrated in the accompanying drawings, and that various modifications and changes may be made without departure from the scope thereof. It is intended that the scope of the present disclosure only be limited by the appended claims.

What is claimed is:

1. A method for a wireless router to perform connection management, comprising:
   when a request for establishing a connection transmitted by a device is received, acquiring identification information of the device;
   if the identification information of the device is identified in a preset blacklist, ignoring the request for establishing the connection;
   if the identification information of the device is not identified in the preset blacklist, performing an operation of a wireless connection with the device;
   when the device tries to establish the wireless connection with the wireless router, counting, by the wireless router, a number of times of authentication failure of the device in a preset time period; and
   when the number of times of authentication failure is larger than or equal to a preset number threshold, performing, by the wireless router, a preset operation of risk treatment;
   wherein the performing of the preset operation of risk treatment comprises:
   transmitting risk reminding information to a preset management terminal;
   after the transmitting of the risk reminding information and before receiving a control instruction from the preset management terminal, setting all authentication results with regard to the device in the preset time period to authentication failure; and
   according to the control instruction received from the preset management terminal, adding the identification information of the device to the blacklist.

2. The method according to claim 1, wherein the performing of the preset operation of risk treatment further comprises:
   after the transmitting of the risk reminding information and before the receiving of the control instruction, pausing an operation of authentication with regard to the device.

3. A first device, comprising:
   a hardware processor; and
   a memory for storing instructions executable by the hardware processor,
   wherein the hardware processor is configured to:
   when a request for establishing a connection transmitted by a second device is received, acquire identification information of the second device;
   if the identification information of the second device is identified in a preset blacklist, ignore the request for establishing the connection;
   if the identification information of the second device is not identified in the preset blacklist, perform an operation of a wireless connection with the second device;
   when the second device tries to establish the wireless connection with the first device, count a number of times of authentication failure in a preset time period, and
   when the number of times of authentication failure is larger than or equal to a preset number threshold, perform a preset operation of risk treatment;
   wherein, in performing the preset operation of risk treatment, the hardware processor is further configured to:
   transmit risk reminding information to a preset management terminal;

after transmitting the risk reminding information and before receiving a control instruction from the preset management terminal, set all authentication results with regard to the second device in the preset time period to authentication failure; and according to the control instruction received from the preset management terminal, add the identification information of the second device to the blacklist.

4. The first device according to claim 3, wherein the hardware processor is further configured to:

after the transmitting of the risk reminding information and before the receiving of the control instruction, pause an operation of authentication with regard to the second device.

5. A non-transitory storage medium having stored therein instructions that, when executed by one or more processors of a wireless router, cause the wireless router to perform a method for connection management, the method comprising:

when a request for establishing a connection transmitted by a device is received, acquiring identification information of the device;

if the identification information of the device is identified in a preset blacklist, ignoring the request for establishing the connection;

if the identification information of the device is not identified in the preset blacklist, performing an operation of a wireless connection with the device;

when the device tries to establish the wireless connection with the wireless router, counting, by the wireless router, a number of times of authentication failure of the device in a preset time period; and when the number of times of authentication failure is larger than or equal to a preset number threshold, performing, by the wireless router, a preset operation of risk treatment;

wherein the performing of the preset operation of risk treatment comprises:

transmitting risk reminding information to a preset management terminal;

after the transmitting of the risk reminding information and before receiving a control instruction from the preset management terminal, setting all authentication results with regard to the device in the preset time period to authentication failure; and according to the control instruction received from the preset management terminal, adding the identification information of the device to the blacklist.

* * * * *